(12) United States Patent
Oggier et al.

(10) Patent No.: US 7,889,257 B2
(45) Date of Patent: Feb. 15, 2011

(54) ON-CHIP TIME-BASED DIGITAL CONVERSION OF PIXEL OUTPUTS

(75) Inventors: Thierry Oggier, Zurich (CH); Michael Lehmann, Winterthur (CH); Bernhard Buettgen, Adliswil (CH)

(73) Assignee: MESA Imaging AG, Zurich (CH)

( * ) Notice: Subject to any disclaimer, the term of this patent is extended or adjusted under 35 U.S.C. 154(b) by 397 days.

(21) Appl. No.: 12/175,091

(22) Filed: Jul. 17, 2008

(65) Prior Publication Data

US 2009/0021617 A1 Jan. 22, 2009

Related U.S. Application Data

(60) Provisional application No. 60/950,399, filed on Jul. 18, 2007.

(51) Int. Cl.
*H04N 3/14* (2006.01)
*H04N 5/335* (2006.01)
*H01L 27/00* (2006.01)

(52) U.S. Cl. ............. 348/308; 348/297; 250/208.1
(58) Field of Classification Search .......... 348/301, 348/302, 308, 297; 250/214 DC, 214 L
See application file for complete search history.

(56) References Cited

U.S. PATENT DOCUMENTS

| | | | | |
|---|---|---|---|---|
| 5,461,425 A | * | 10/1995 | Fowler et al. | 348/294 |
| 5,856,667 A | | 1/1999 | Spirig et al. | |
| 5,920,274 A | * | 7/1999 | Gowda et al. | 341/155 |
| 6,330,030 B1 | * | 12/2001 | O'Connor | 348/297 |
| 6,417,882 B1 | * | 7/2002 | Mahant-Shetti | 348/302 |
| 6,522,395 B1 | * | 2/2003 | Bamji et al. | 356/5.01 |
| 6,529,240 B2 | * | 3/2003 | Tan et al. | 348/302 |
| 6,606,122 B1 | * | 8/2003 | Shaw et al. | 348/302 |
| 6,667,769 B2 | * | 12/2003 | Harton et al. | 348/308 |
| 6,670,904 B1 | * | 12/2003 | Yakovlev | 341/167 |
| 6,777,659 B1 | | 8/2004 | Schwarte | |
| 6,825,455 B1 | | 11/2004 | Schwarte | |
| 7,012,248 B2 | * | 3/2006 | Paschalidis | 250/287 |
| 7,265,329 B2 | * | 9/2007 | Henderson et al. | 250/208.1 |
| 7,379,011 B2 | * | 5/2008 | Ham et al. | 341/170 |

(Continued)

FOREIGN PATENT DOCUMENTS

DE 44 40 613 C1 7/1996

(Continued)

*Primary Examiner*—John M Villecco
(74) *Attorney, Agent, or Firm*—Houston Eliseeva LLP

(57) ABSTRACT

An integrated sensor chip comprises at least one pixel. The at least one pixel comprises: one or several integration regions for receiving and storing photogenerated charges; a modulation region that moves the photogenerated charges to be stored in the at least two integration regions; and sense nodes, in which each of the sense nodes is associated with one of the integration regions, into which the photogenerated charges are moved from the integration regions during a readout stage. The chip comprises: at least one function generator for generating a time-varying function that is applied to the integration regions during the readout cycle to move the photogenerated changes to the sense nodes; a counter generates a count during the generation of the time-varying function; and registers, in which each of the registers is associated with one of the sense nodes during read out, for storing digital values; wherein the registers store the count in response to the associated sense node receiving photogenerated charges from the associated integration regions.

15 Claims, 7 Drawing Sheets

U.S. PATENT DOCUMENTS

| | | | |
|---|---|---|---|
| 7,586,077 B2 * | 9/2009 | Lehmann et al. | 250/208.1 |
| 7,623,173 B2 * | 11/2009 | Nitta et al. | 348/302 |
| 7,671,671 B2 * | 3/2010 | Buettgen et al. | 329/345 |
| 7,804,438 B2 * | 9/2010 | Krymski | 341/167 |
| 2002/0084430 A1 * | 7/2002 | Bamji et al. | 250/559.05 |
| 2006/0108611 A1 | 5/2006 | Seitz | |
| 2006/0157643 A1 * | 7/2006 | Bamji et al. | 250/208.1 |
| 2010/0141821 A1 * | 6/2010 | Fossum et al. | 348/308 |
| 2010/0277622 A1 * | 11/2010 | Fossum et al. | 348/241 |

FOREIGN PATENT DOCUMENTS

| | | |
|---|---|---|
| DE | 198 21 974 A1 | 11/1999 |
| GB | 2 389 960 A | 12/2003 |
| WO | 2006/010284 A1 | 2/2006 |
| WO | 2007/045108 A1 | 4/2007 |

* cited by examiner

ON-CHIP TIME-BASED DIGITAL CONVERSION OF PIXEL OUTPUTS

RELATED APPLICATIONS

This application claims the benefit under 35 USC 119(e) of U.S. Provisional Application No. 60/950,399, filed on Jul. 18, 2007, which is incorporated herein by reference in its entirety.

BACKGROUND OF THE INVENTION

Time of flight (TOF) sensors typically utilize charge-coupled device (CCD) or complementary metal oxide semiconductor (CMOS) based technologies that are able to sample at high speed. The typical application is for point distance sensing or three-dimensional (3D) imaging in which the scene of interest is actively illuminated with modulated illuminating radiation and the sensor sampling is performed synchronously with the modulation of the illuminating radiation. These high speed sensors are also useful in other application such as fluorescence lifetime imaging.

Generally, in these sensors, light is converted to electrical, charge carriers, usually electrons, but holes could also be used, in a photosensitive region. Switches are then opened and closed accordingly to transfer the charge carriers to one or more integration gates where the charge is stored until readout is performed. In the typical example, specific integration gates are assigned to different phases within the period of the stimulation or illuminating radiation such that the switches are controlled synchronously with the stimulation radiation in order to move the charge carriers from the photosensitive region to the integration gates for the phase assigned to that gate.

An early example of a TOF sensor was disclosed in the German patent DE4440613C1 (Spirig, "Vorrichtung und Verfahren zur Detektion eines intensitatsmodulierten Strahlungsfeldes", 1996). See also U.S. Pat. No. 5,856,667. A demodulation device is presented that samples the impinging optical sinusoidally-modulated illumination radiation n times. Charge coupled devices are used for the detection of the illumination radiation and the subsequent transport of the photo-generated charges.

Later, German patent application DE19821974A1 (Schwarte, Vorrichtung und Verfahren zur Erfassung von Phase und Amplitude elektromagnetischer Wellen, 1999), see also U.S. Pat. No. 6,825,455 B1, disclosed a photon-mixing element for a TOF sensor in which the switches that are used to transfer the charge carriers to the integration gates are controlled based on the modulation used for the illumination signal. In order to get a pixel with high-sensitivity and high-speed demodulation facility, a combined structure of stripe-like elements, each of them with short transport paths, is proposed. Nevertheless, the stripe-like structure leads to a poor fill-factor because the regions between the stripes are not photo-sensitive.

Another approach for large-area demodulation pixel for a TOF sensor with high sensitivity and high demodulation speed is given in the English patent application GB2389960A (Seitz, "Four-tap demodulation pixel", 2003). See also US. Pat. Publ. No. US 2006/0108611 A1. A high-resistive photogate of rectangular shape and large size generates a drift-field within the semiconductor substrate enforcing the photo-generated charges to drift to the particular sampling node. Here, any delay of the sampling signal arising on the photo-gate due to large resistance-capacitance (RC) times can reduce the performance of such demodulation pixels. In particular, high frequencies are difficult to realize when many pixels are controlled at the same time. Then the external electronics and their limited driving capability of large capacitances represent the constraining factor.

All pixel structures mentioned above have a common property that the lateral conduction of the photo-generated charges into a specific direction is always related to the push-pull signal on a gate structure spanning the photosensitive photodetection area of the pixel. In order to get higher sensitivities, the photodetection area has to be enlarged, this results in either increased parasitic capacitances that have to be switched or longer transport paths. Both aspects are undesirable because they detrimentally impact the speed of these devices. If the switching gate capacitances increase, the speed limitations are dictated by the driving electronic components. On the other hand, long transport paths increase the time required for the photo-generated charges to reach storage in the integration regions.

WO 2007/045108 A1 presents a newer TOF sensor example. Here, the drift field over most or all of the photosensitive area is basically static in time. The static or quasi static field in the photosensitive region moves or dumps the charge carriers into a typically smaller modulated region, which may or may not be photosensitive. The charge carriers are then swept from the modulated region into integration regions or gates synchronously with the modulated signal. This newer system can operate at much higher frequencies because demodulation is over a much smaller area, having a lower intrinsic capacitance, whereas transport within the large photosensitive region can be optimized for speed. The newer demodulation device avoids the trade-off between the sensitivity/fill-factor and the demodulation speed. Both aspects can be optimized in the pixel at the same time using this technology.

In all of these TOF sensors, the charge that is accumulated in the integration regions of each pixel must be read out. This readout typically happens in a readout stage. Two types of information are important. First the total amount of charge held in all of the integration regions of a pixel is important to generate the standard two-dimensional (2D) grayscale image of the scene (offset). Second, the difference in the amount of charge held in the integration regions is important to generate the 3D depth information and to generate the amplitude for each pixel.

A method to determine theses different amount of charges in the integration gates is described in WO2006010284A1 FIG. 6, and FIG. 7. This readout method can be used in combination with all aforementioned CMOS or CCD based TOF pixels. The drawback of this disclosed system is that a rather big storage capacitance is required for the background light suppression as well as the read out node.

SUMMARY OF THE INVENTION

The present invention concerned improved system and method for detecting the charge contained on the integration gates and also the difference in charge on the integration gates of each pixel. Instead of first shifting the charge from the integration gate to the sense node and then reading-out the analog value, the present system measures the time it takes from beginning of lowering the potential of the integration gate to when the charge starts flowing to the sense node.

There are several advantages of this method. The output of the pixel is digital in the sense that there is no need to convert a certain amount of charge to an equivalent potential, but only show, when there was some charge flow from the integration gate. For the digital output, the sense node should be made as small as possible, thereby saving space in the pixel, while increasing the sensitivity of the sense node.

Second, both taps can be converted into a digital value without clipping the background illumination. Therefore a grayscale image is again available as it was not in other systems (e.g. WO2006010284A1).

Third, the resolution of the conversion can be easily adjusted by either increasing/decreasing the counter speed or by lowering the integration faster or slower respectively. It is even possible to adjust the resolution for the offset and the difference value separately by applying specific control functions to the integration gate.

In general, according to one aspect, the invention features an integrated sensor chip comprising at least one pixel. The at least one pixel comprises: one or several integration regions for receiving and storing photogenerated charges; a modulation region that moves the photogenerated charges to be stored in the at least two integration regions; and sense nodes, in which each of the sense nodes is associated with one of the integration regions, into which the photogenerated charges are moved from the integration regions during a readout stage. The chip comprises: at least one function generator for generating a time-varying function that is applied to the integration regions during the readout cycle to move the photogenerated charges to the sense nodes; a counter that generates a count during the generation of the time-varying function; and registers, in which each of the registers is associated with one of the sense nodes, for storing digital values; wherein the registers store the count in response to the associated sense node receiving photogenerated charges from the associated integration regions.

In general, according to one aspect, the invention features a read out method for an integrated sensor chip. The method comprises receiving and storing photogenerated charges in at least two integration regions synchronously with modulated radiation illuminating a scene; moving the photogenerated charges to be stored in at least two integration regions; and moving the photogenerated charges from the integration regions to sense nodes during a readout cycle by applying a time-varying function to the integration regions. A count is generated during the generation of the time-varying function and stored in response to the associated sense node receiving photogenerated charges from the associated integration regions.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Many applications require the measurement of phase delays between an optical illumination signal and an electronic reference signal. Some examples are three-dimensional (3D) range measurement, fluorescence imaging, or optical communication.

In the first example, three-dimensional imaging, the acquisition of the distance information is accomplished by the measurement of the time-of-flight. That is the time the light needs for the round-trip from the measurement system, i.e., camera, to the object and back again to the system.

Figure 1:
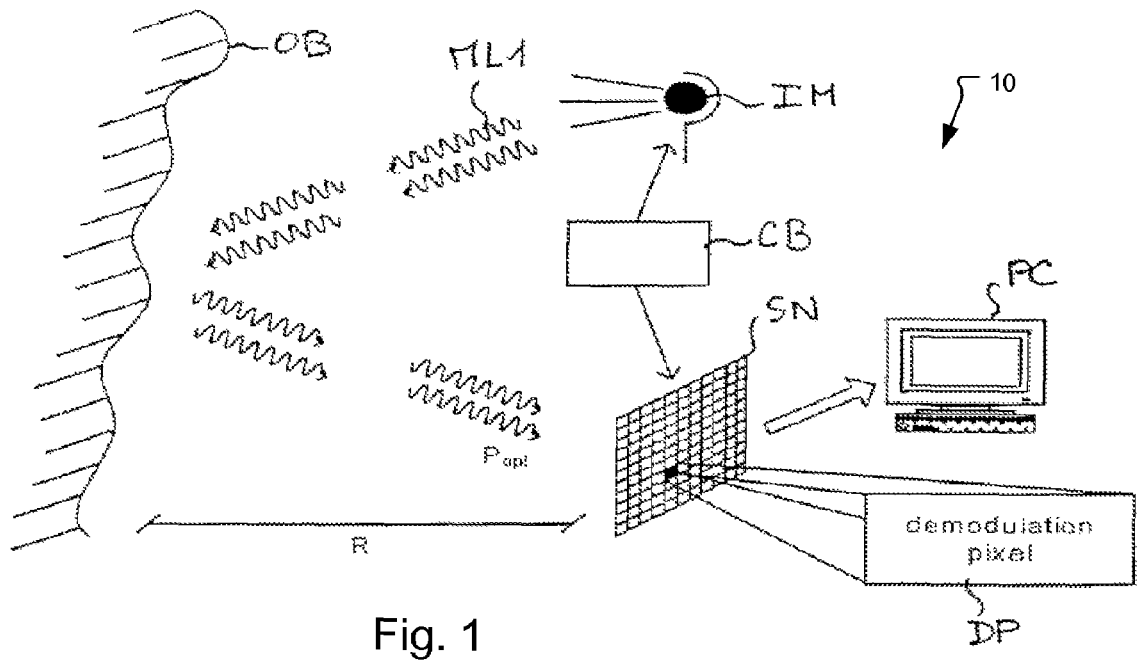
FIG. 1 shows a conventional scheme of the three-dimensional-measurement set-up using a sensor comprising demodulation pixels.

FIG. 1 illustrates the basic principle of such a 3D-measurement camera system.

Modulated illumination light ML1 from an illumination module or light source IM is sent to the object OB of a scene. A fraction of the total optical power sent out is reflected to the camera 10 and detected by the image sensor SN. The sensor SN comprises a single pixel (point ranging) or a pixel matrix comprised of demodulation pixels DP. Each pixel DP is capable of demodulating the impinging light signal. A separate control board CB regulates the timing of the camera 100. The phase values of all pixels correspond to the particular distance information of one point in the scene. They are read out and displayed for example by a personal computer PC.

The distance R is calculated by $$R = (c \ast TOF)/2,$$

with c as light velocity and TOF corresponding to the time-of-flight. Either pulse intensity-modulated or continuously intensity-modulated light is sent out by the illumination module or light source IM, reflected by the object and detected by the sensor. If each pixel of the sensor is capable of demodulating the optical signal at the same time, the sensor is able to deliver 3D images in real-time, i.e., frame rates of up to 30 Hertz (Hz), or even more, are possible. In pulse operation the demodulation would deliver the time-of-flight directly. However, continuous sine modulation delivers the phase delay (P)

between the emitted signal and the received signal, also corresponding directly to the distance R:

$$R=(P*c)/(4*pi*fmod),$$

where fmod is the modulation frequency of the optical signal.

Figure 2A:
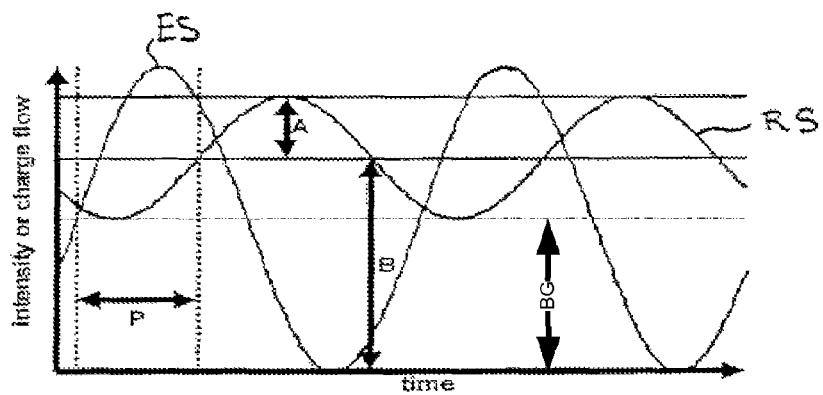
FIGS. 2A and 2B are plots representing the optical intensity and the charge flow as a function of the time for the emitted signal and the received signal, respectively, using the scheme of FIG. 1.
Figure 2B:
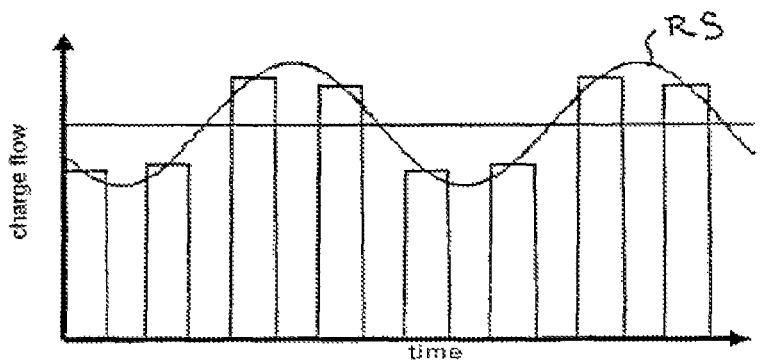

FIGS. 2A and 2B show the relationship between signals for the case of continuous sinusoidal modulation and the signal sampling. Although this specific modulation scheme is highlighted in the following, the utilization of the pixel in 3D-imaging is not restricted to this particular scheme. Any other modulation scheme is applicable: e.g. pulse, rectangular, pseudo-noise or chirp modulation. Only the final extraction of the distance information is different.

FIG. 2A shows both the modulated emitted illumination signal ES and received signal RS. The amplitude A, offset B of the received signal RS and phase P between both signals are unknown, but they can be unambiguously reconstructed with at least three samples of the received signal. BG represents the received signal part due to background light.

As shown in FIG. 2B, a sampling with four samples per modulation period is depicted. Each sample is an integration of the electrical signal over a duration dt that is a predefined fraction of the modulation period. In order to increase the signal to noise ratio of each sample the photo-generated charges are accumulated over several modulation periods, in some embodiments.

By activating the conduction channels of the demodulation region alternately the photogenerated charge injected into the demodulation region and spread out below the complete gate structure, is forced to drift or diffuse to the specific storage site. The alternation of the channel activation is done synchronously with the sampling frequency.

The electronic timing circuit, employing for example a field programmable gate array (FPGA), generates the signals for the synchronous channel activation in the demodulation stage. During the activation of one conduction channel, injected charge carriers are moved to the corresponding integration region. As example, only two conduction channels are implemented in the demodulation region. Assuming there is no background light BG (i.e., A=B), then two samples A0 and A1 of the modulation signal sampled at times that differ by half of the modulation period, allow the calculation of the phase P and the amplitude A of a sinusoidal intensity modulated current injected into the sampling stage. The equations look as follows:

$$A=(A0+A1)/2$$

$$P=\arcsin[(A0-A1)/(A0+A1)].$$

Extending the example to four conduction channels and sample values requires in practice a different gate structure of the demodulation region with four contacts and four integration regions and an appropriate clocking scheme for the electrode voltages in order to obtain four sample values A0, A1, A2 and A3 of the injected current. Generally the samples are the result of the integration of injected charge carriers over many quarters of the modulation period, whereby finally each sample corresponds to a multiple of one quarter of the modulation period. The phase shift between two subsequent samples is 90 degree.

Instead of implementing the four channels, one can also use two channels only, but adding a second measurement with the light source delayed by 90 degrees in order to get again the four samples.

Using these four samples, the three decisive modulation parameters amplitude A, offset B and phase shift P of the modulation signal can be extracted by the equations $$A=\mathrm{sqrt}\,[(A3-A1)\wedge 2+(A2-A1)\wedge 2]/2$$

$$B=[A0+A1+A2+A3]/4$$

$$P=\arctan[(A3-A1)/(A0-A2)]$$

Figure 3:
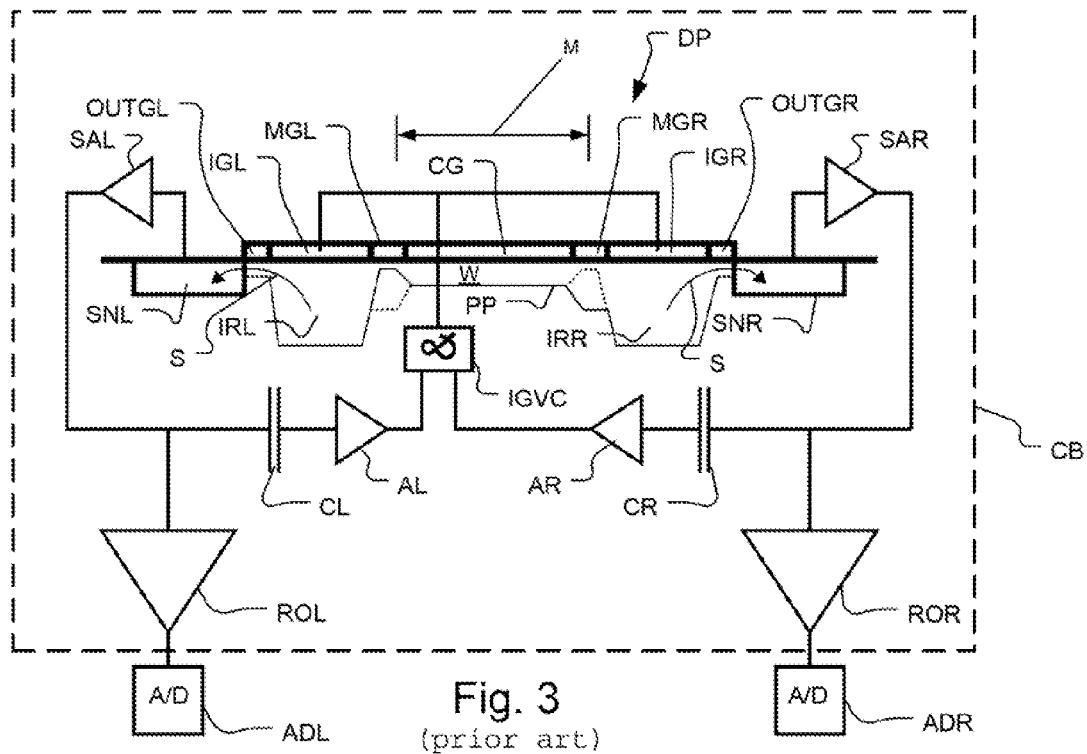
FIG. 3 is a schematic diagram illustrating read out of a demodulation pixel according to the prior art.

FIG. 3 shows prior art circuit as described in WO2006010284A1 for reading out the photogenerated charge stored in the integration regions of the demodulation pixel DP and specifically generate signals corresponding to the sum and difference of the photogenerated charge held in the integration regions of the demodulation pixel.

Charge is swept from the modulation region M, which is either photo-sensitive or photo-insensitive, and gathers in left and right integration regions IRL, IRR, under respective left and right integration gates IGL, IGR.

The illustrated system uses a three gate structure, a center, unmodulated, gate CG in combination with left and right modulated gates MGL, MGR in the modulation region M to sweep the charge into either integration region IRL, IRR under integration gates IGL, IGR.

In operation, profile of the potential PP is raised on one modulation gate while be lowered on the other modulation gate in order to create a drift field that moves the charge laterally across the pixel P and into the corresponding integration gate. In the illustrated example, the dotted portions of the potential profile PP are applied during one phase within the period of the illumination radiation. These dotted portions indicate a low potential on the right modulation gate MGR and higher potential center gate CG and even higher potential on the left modulation gate MGL to move charge in modulation region M to the left integration region IRL under the left integration gate IGL. During another phase of the illuminating radiation, the potentials indicated by the solid lines of the potential profile PP are applied across the modulation region M. The solid portions of the potential profile PP indicate a low potential on the left modulation gate MGL and high potential on the right modulation gate MGR to move charge to the right integration region IRR under the right integration gate IGR.

Depending on a selected integration period, charges are collected in the integration regions IRL, IRR for one or several cycles of the stimulation or illumination radiation before readout of the pixel DP is initiated.

During the read-out stage, the charge in the integration regions IRL, IRR is first shifted over outgates OUTGL, OUTGR, see arrow S, to an associated left sense node SNL and right sense node SNR, which are typically diffusions in the substrate W. During the readout stage, the potentials of both modulation gates MGL, MGR are lowered to isolate the integration regions IRL, IRR from the modulation region M.

To effect read-out, the potentials of the integration gates IGL, IGR are continuously decreased (assuming electron charge carriers) by the integration gate voltage controller IGVC until both sense nodes SNL, SNR have received charge from under their associated integration gate IGL, IGR. In some examples, the integration gates IGL, IGR potential is lowered in a linear fashion whereas in other commercial devices, the potential lowered initially at a high rate of change with rate of change then reduced and possibly linear.

The control of the integration gates IGL, IGR is individual for each pixel since the potential is lowered on the integration gates IGL, IGR only until charge is received on both sense nodes SNL, SNR. In more detail, left sense amplifier SAL and right sense amplifier SAR are responsive to the charge on the respective sense nodes SNL, SNR. Right and left timing capacitors CL, CR receive the voltage output from the left sense amplifier SAL and right sense amplifier SAR, respectively. The signals from the capacitors CL, CR is amplified by left and right amplifiers AL, AR and provided as inputs to the integration gate voltage controller IGVC. When both inputs go to logic high, the integration gate voltage controller IGVC stops lowering the potentials of both integration gates IGL, IGR. Only then is the charge is readout through readout amplifiers ROL, ROR and converted to digital signals by off-chip, see chip boundary CB, analog to digital converters ADL, ADR. That is, the sense nodes are read out through the analog signal paths, which is implemented on the sensor chip CB and then externally converted to digital values by analog to digital converters A/D that are located off of the sensor chip CB.

This system provides a signal output corresponding to the difference in the charges collected by the integration gates IGL, IGR. This difference is finally used for the calculation of phase P (see equation above).

The background can be derived by reading out the voltage applied to integration gate at the time the integration gate decrease had been stopped.

The combination of integration gates and sense nodes enables this sensor to be both sensitive, on one hand, and function under large variations in illumination, i.e., dynamic range, on the other hand. The integration gates IGL, IGR can be made large in order to contain a large number of photogenerated electrons as would result from observing a well-lit screen. On the other hand, the sense nodes SNL, SNR can be made smaller for increased sensitivity, because to avoid saturation they must only be able to contain an amount of charge represented by the difference between the charge contained in the two integration gates IGL, IGR.

Figure 4:
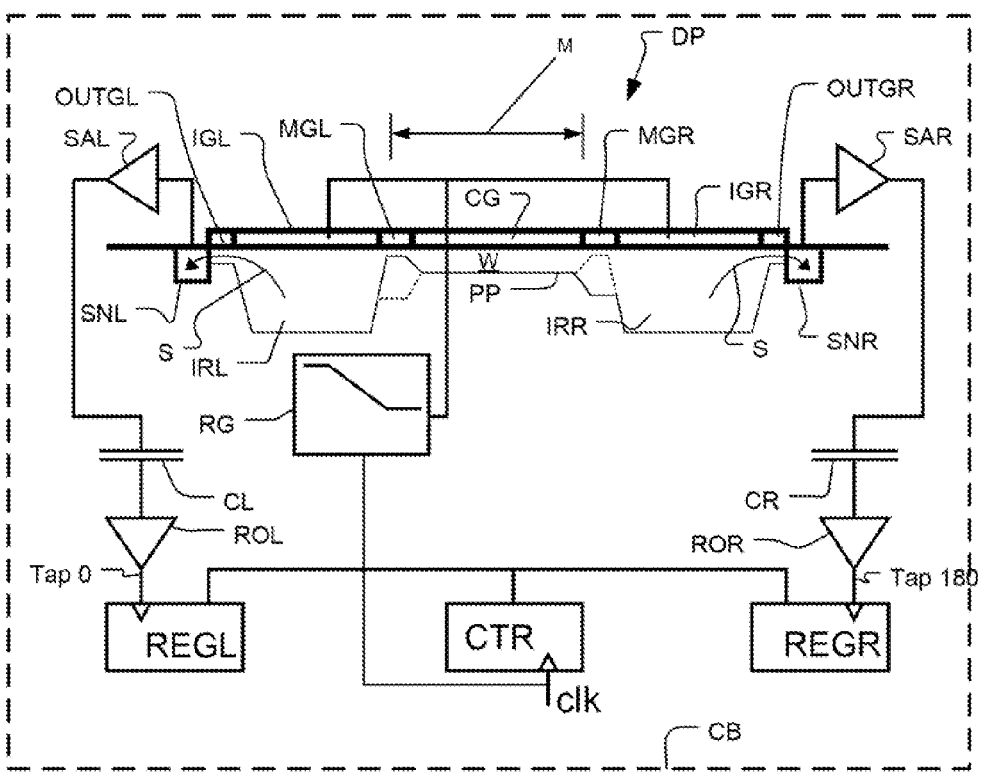
FIG. 4 is a schematic diagram illustrating read out of a demodulation pixel according to an example of the present invention.

FIG. 4 shows a circuit for reading out the photogenerated charge stored in the integration regions of the demodulation pixel DP, which has been constructed according to the principles of the present invention. This circuit measures the time it takes from the beginning of the lowering the potential of the integration gates to when the charge starts flowing to the sense node.

There are similarities with FIG. 3. Charge is swept from the modulation region M, and gathers in left and right integration regions IRL, IRR, under respective left and right integration gates IGL, IGR as described previously.

During the read-out stage, a ramp generator RG is used to generate function of decreasing potential that is applied in common to both integration gates IGL, IGR under control of a clock signal clk. At the same or near the time when the ramp generator RG initiates application of the ramp function intg to the integration gates IGL, IGR under control of the clock pulse clk, a counter CTR also responds to the clock pulse clk to begin a count that is held in each of two registers REGL, REGR, associated with the two integration gates IGL, IGR, respectively.

At some point, the decreasing potential applied to the integration gates IGL, IGR by the ramp generator RG causes the charge carriers to spill over the potential barrier between the integration gates IGL, IGR and into the respective sense nodes SNL, SNR. This signal is amplified by sense amplifiers SAL, SAR, and held on sense node capacitors CL, CR and is amplified by right and left readout amplifiers ROL, ROR. When the charge on the respective capacitors CL, CR is high enough, the charge causes the generation of pulse signals tap0, tap 180 that trigger the corresponding registers REGL, REGR to latch the current count of counter CTR.

In this way, two counts are generated and held in the respective latching registers REGL, REGR. These counts are proportional to the charge that was held in each of the integration gates IGL, IGR.

In different embodiments, the ramp generator 110 generates ramp signals intg with different time dependent profiles. In one example, this ramp signal intg is a linear ramp. In other examples, the ramp is a logarithmic function.

Resolution

Figure 5:
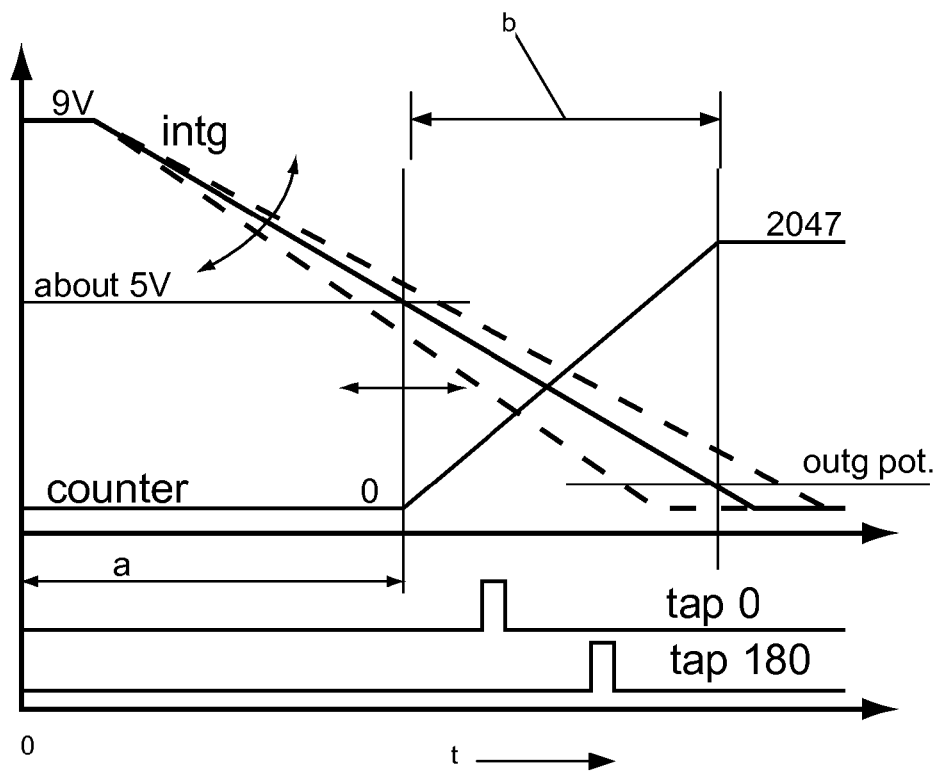
FIG. 5 is a plot of voltage as a function of time illustrating the operation of the ramp generator according to one embodiment.

FIG. 5 illustrates the operation of the ramp generator RG, counter CTR and latch or register system REGL, REGR to function as a ramp analog to digital converter (ADC), in one embodiment. In this example, the charge carriers are electrons, although hole charge carriers can be used with appropriate changes in substrate doping and voltages.

In response to the clock signal clk occurring at time=0, the potential on the integration gates is decreased, linearly in this example, according to ramp function intg. As soon as charge flows from under the integration gates IGL, IGR to the corresponding sense nodes SNL, SNR, sense amplifiers SAL, SAR function as charge detectors. The combination of capacitors CL, CR and readout amplifiers ROL, ROR then function as the pulse generators to generate pulses used to trigger the latching registers REGL, REGR. For one pixel DP, two pulses are therefore generated for the tap0 (integration gate IGL) and tap 180 (integration gate IGR), respectively.

It should be noted that the pulses tap0, tap 180 will not appear over the whole range of the ramp intg. The modulation gates MGL, MGR are toggling between a limited range, 0 and 5V in one example. As a result, the integration gates IGL, IGR with the nominal 9V potential, in one example, will only be filled up to these 5 Volts (in a first order approximation). Further, the outgates OUTGL, OUTGR, the barrier between the integration gates and the sense nodes, has a potential of 1V, for example, which is 4 volts less than the limit for the integration gates. Therefore, until the integration gates have reached 9V-4V=5V, see time period a, no charge can flow to the corresponding sense node.

On the other side, when the integration gate potential has a potential of less than the outg, meaning 1V, all the charge will already have been transferred to the sense node. The interesting part of the ramp is thus, from 5V to 1V, region b, which is only half the span within 9V to 1V, in one specific example.

In parallel with the ramping of the integration gates IGL, IGR, the counter CTR counts up, preferably after a delay corresponding to time period a, and its actual values are stored in the two registers REGL, REGR when the two pulses tap0, tap 180 are generated.

When the main clock of the counter is fixed, e.g. to 100 MHz, there are two parameters to optimize. First, the ramp steepness can be increased or decreased. This allows for adapting the interesting part of the ramp (5V to 1V) to the counter range. Second the start of the counter can be adjusted (parameter a), this is kind of a dead time, because within this time, the counter is preferably on hold.

If a linear ramp is applied from 9V to 0V, then the dead time is as long as the counting itself. With a counter speed of 100 MHz, the counter has to count for about 20 microseconds (μs) to get an 11 bit resolution; the whole conversion of one line is at least 40 μs.

Figure 6:
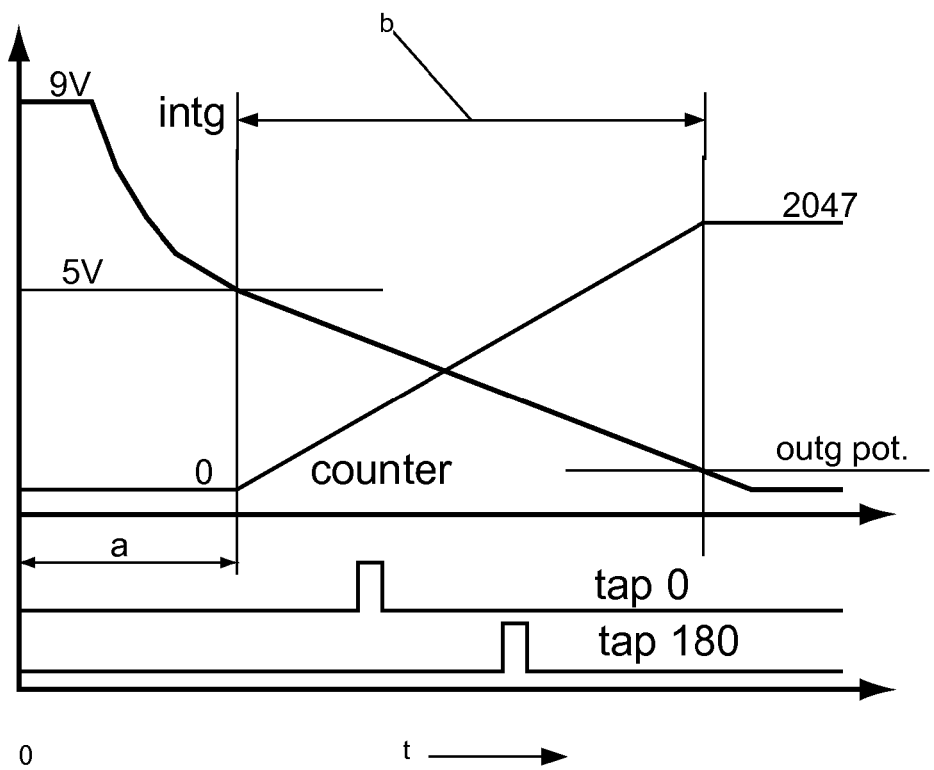
FIG. 6 is a plot of voltage as a function of time illustrating the operation of the ramp generator according to a second embodiment.

FIG. 6 shows alternative embodiment of the ramp function intg generated by the ramp generator RG.

Here, the solution is e.g. to increase the slope, or change in voltage as a function of time, during the first part of the ramp, see time period a. Then, the dead-time is decreased to about half the counting time, i.e., time period b. This would decrease the conversion time to 30 μs.

Figure 7:
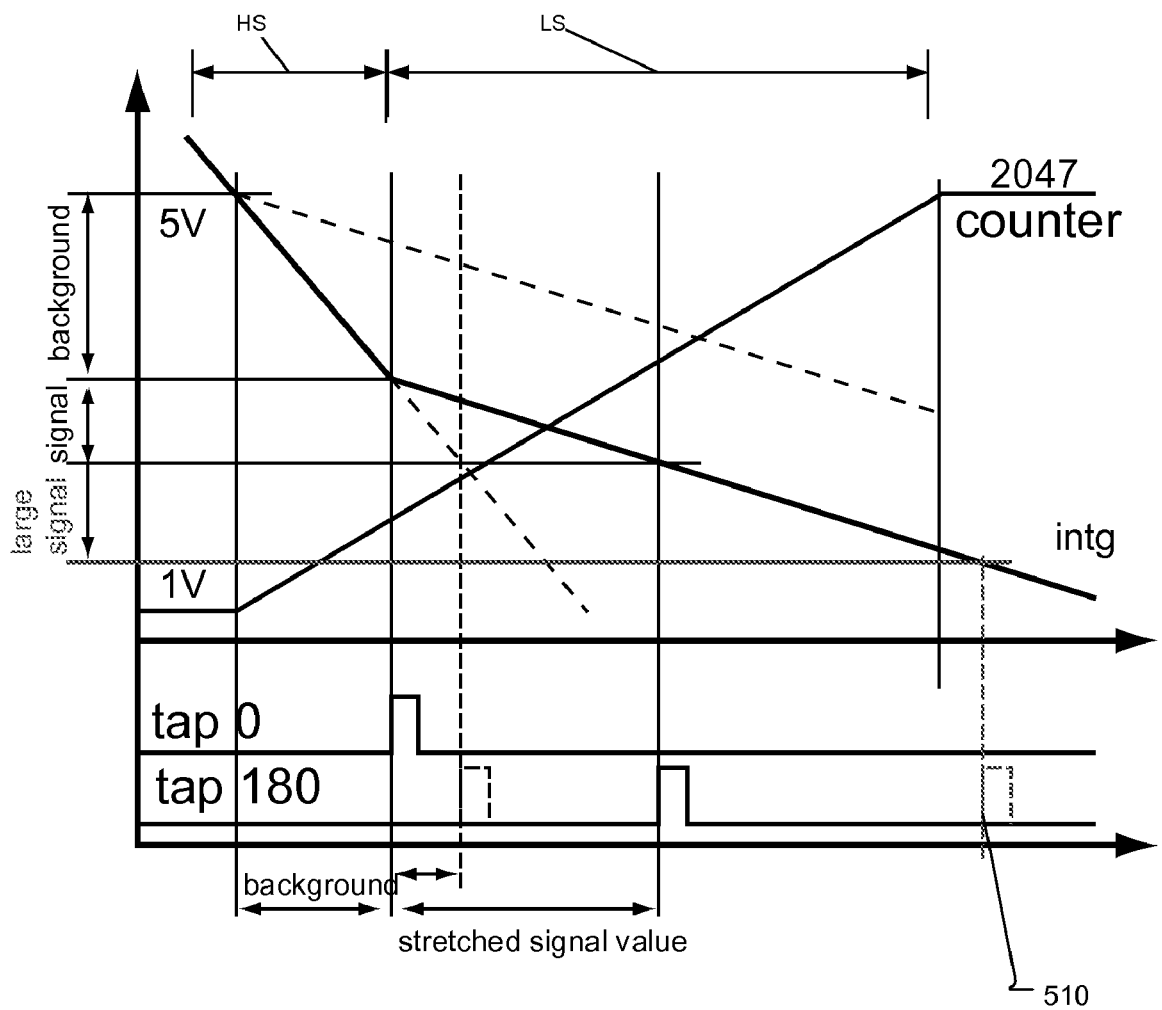
FIG. 7 is a plot of voltage as a function of time illustrating the operation of the ramp generator according to a third embodiment.

In this example, the voltage applied to the integration gate is decreased quickly until the signal range is achieved at 5V. After this point, the voltage then decreases in a linear fashion. At the same 5V signal threshold, In one example, the integration gates IGL, IGR can handle about 2.4 million electrons. Depending on the amount of stored electrons, they are spilled to the sense node somewhere between an intg-potential of 5 to 1V. With a counter resolution of 11 bits, the amount of charge can be detected with a resolution of 2.4 Me-/2048=1100 electrons FIG. 7 shows another embodiment that provides for enhanced resolution. It relies on switching the potential slope of the ramp signal intg between two values: at the beginning, a fast ramp HS is applied as long as no charge has reached in either of the sense nodes. When this happens, i.e., charge is sensed on at least one sense node, the ramp generator RG switches to a ramp function that has a reduced slope, i.e., voltage change as a function of time, thereby increasing the resolution. In the example, the generation of the tap0 pulse switches the ramp generator to generate the ramp with reduced slope. This enables a higher digital resolution on the difference value. For phase measurements, a high resolution of the difference value is much more important than high resolution of the common charge level.

The time period corresponding to the lower slope region LS is used for the signal difference value (difference of the two outputs from the integration regions). The high slope HS is faster than the low slope LS in the example, therefore giving a higher resolution for the difference signal value (LS) than for the background level (HS).

The background (BG) or grey scale is deduced indirectly by the higher of the two deduced digital signal values. Nevertheless, the background is deduced indirectly, since the dark level is not precisely known. Thus, preferably, the pixel is characterized during initialization to determine its dark level. Since the dark level is at lowest integration gate potential, its value will be highest. The background will then be: BG=Dark Level−max(tap0, tap 180).

The disadvantage of this implementation is that large signal differences might get out of the counter range and cannot be detected anymore. This occurs when one of the pulses, tap0, tap 180 arrives after the counter has overflowed, see reference 510. However, in practice, this will be adjusted dependent on the application to avoid such overflow.

In this example, the low slope (LS) has a steepness of half the nominal slope discussed with reference to FIG. 4 and has a resolution of about 550 electrons per least significant bit (LSB) of counter CTR, and the steep slope has a resolution of 2200 electrons per LSB, in one example.

With an appropriate adjustment between the two slopes (e.g. 6:1), the resolution can be increased even more. As you can see, when the signal is too large, the counter comes out-of-range and the information is lost.

Figure 8:
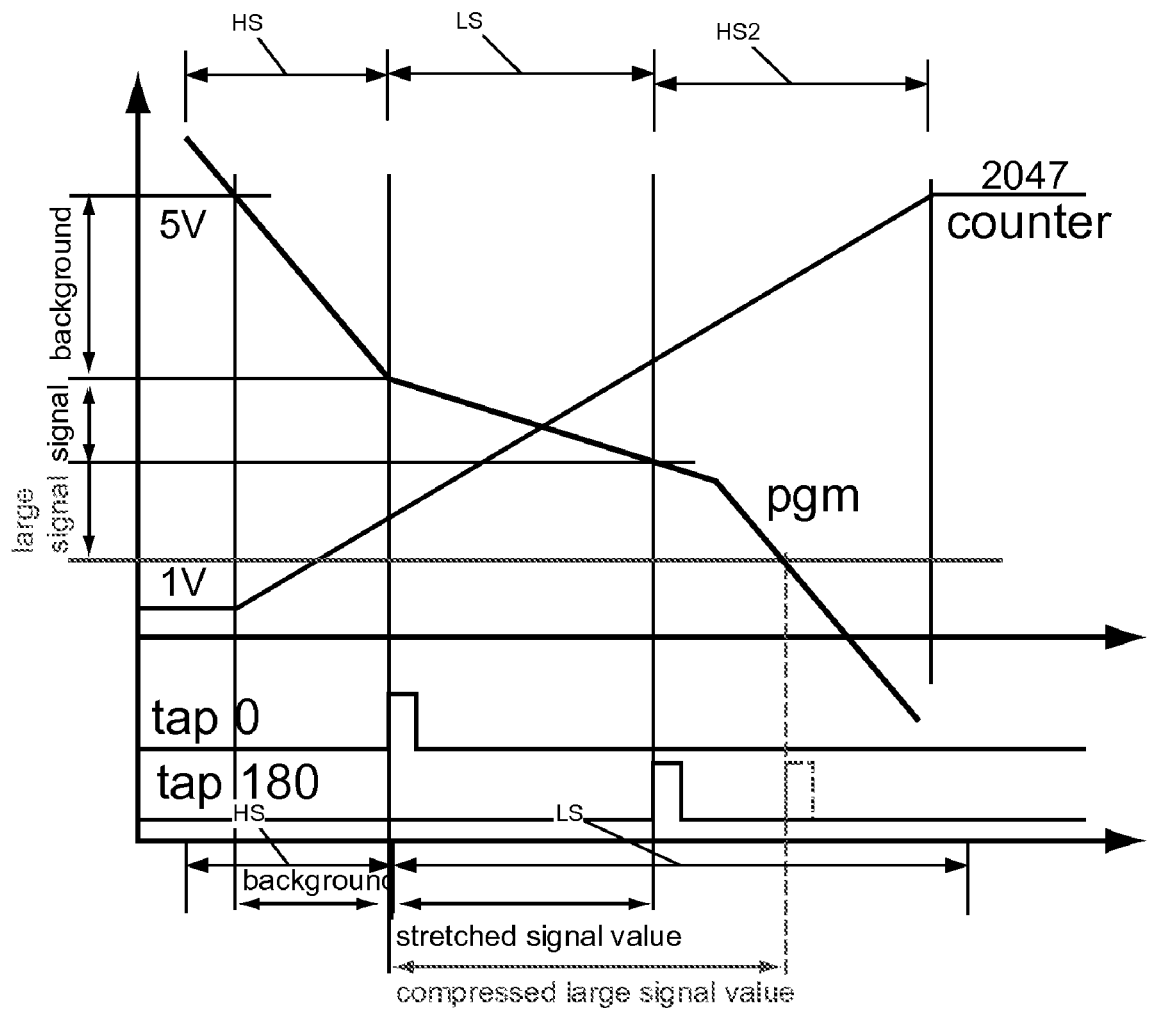
FIG. 8 is a plot of voltage as a function of time illustrating the operation of the ramp generator according to a fourth embodiment.

FIG. 8 illustrates another embodiment to overcome this saturation. Here, the ramp generator RG switches again to the steeper slope HS2. Then, large signals are converted with a smaller resolution than small signals. The information is compressed but saturation is avoided.

The switching between the two slopes LS and HS2 has to be fast and accurate (ideally within less than one clock cycle), otherwise non-linearities in the response are introduced.

In another embodiment, the slope over the LS and HS2 periods is logarithmic with increasing slope.

It should be noted that in the embodiments of FIGS. 7 and 8, a universal ramp generator for all pixels being read out is no longer possible. Instead a separate ramp generator is required for each pixel during the read out cycle.

Sensor Block Diagram

Figure 9:
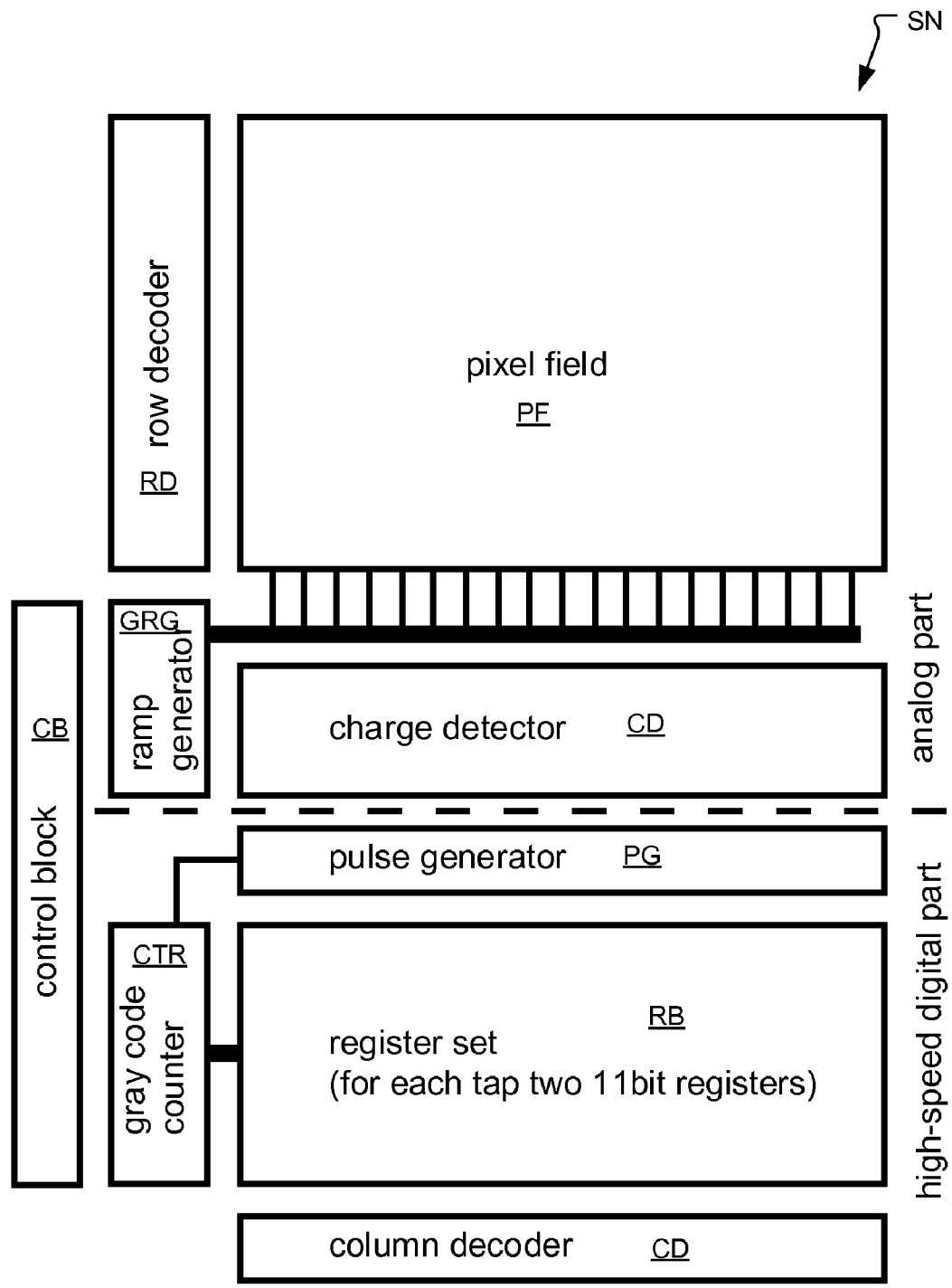
FIGS. 9 and 10 are block diagrams of the digital sensor chip S with a common ramp generator (FIG. 9) or with local ramp generators for adapted ramp slope (FIG. 10).
Figure 10:
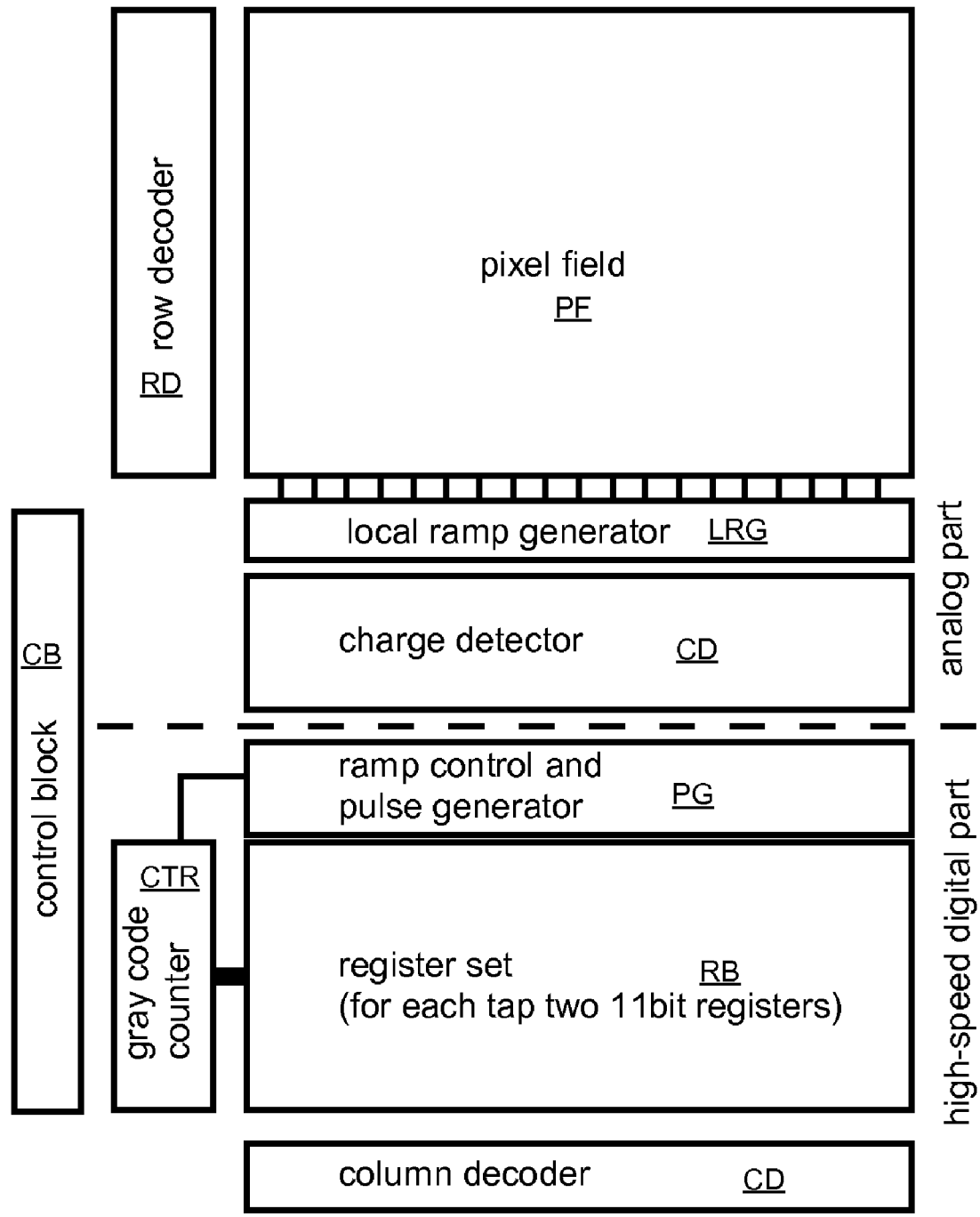

FIGS. 9 and 10 are block diagrams of the digital sensor chip SN with a common ramp generator (FIGS. 5 and 6) or with local ramp generators for adapted ramp slope (FIGS. 7 and 8).

In both FIG. 9 and 10, the sensor SN includes a pixel field PF. A row decoder RD selects one row for read out processing.

The counter CTR counts up. It is of gray code type to reduce the amount of toggling in the digital part. A small control block CB starts and stops both the ramp generator and the counter. These blocks are common for all columns.

In each column, several other blocks are located: the charge detectors CD. The pulse generator PG ensures that the output of the charge detectors CD is sampled by the counter clock and provides a single pulse to latch the actual counter value.

The register bank RB is most space consuming item. It has to hold 2 register banks for each tap with the full resolution of the counter (e.g. 11 bit). The two register banks are needed for reading the sensor out while the next line is converted. The column decoder CD addresses the columns of the pixel field PF.

FIG. 9 shows the global ramp generator GRG that ramps the integration gates with a specified speed and linearity. The ramp signal can be either common for all integration gates or it can be local for each column.

The most critical part will be this ramp generator, which needs to control the potential of the integration gates very accurately through the whole range from 9V to 0V.

The speed of the ramp must be adjusted so, that the integration gates are fully discharged within the line time.

FIG. 10 shows the local ramp generator LRG configuration. Here ramp generators are provided for each pixel so that the two-stage/charge-detection-dependent ramp illustrated in FIGS. 7 and 8 is utilized.

Direct discharge

One solution to generate the ramp is to use the existing capacitance of the integration gate, its wiring and additionally an external capacitance (for noise and linearity reasons) and discharge it through a constant current.

Charge Detector

The charge detector CD is a simple SC-circuit containing a one stage inverting amplifier, which implements a high gain. It is reset while a new line is selected and whenever the charge flows out of the integration region and lowers the sense node of the appropriate pixel output by a certain amount, the detector applies a '1' at its output. A Schmitt-trigger functionality is applied for a correct setting without ringing.

Gray Code Counter

The counter must count with high speed from 0 to the maximum resolution. This counter value is then distributed all over the register set, meaning a lot of load is connected to the counter outputs. To reduce the load and therefore also the power consumption and the noise, the counter provides its output Gray coded.

Additionally, the counter not only provides the actual code but also the clock for the pulse generator to sample the output of the charge detectors. Because both this clock and the output of the counter are fed from the left side the pulse generator and the register set, the signal arrives at about the same time at both blocks.

Ramp Controller

The ramp controller will control the switching between the steep and the plain slope of the ramp on the integration gate. It has to switch to the slow ramp after the first pulse and eventually switch back to the fast one after a given time.

Pulse Generator

The pulse generator is attached to the charge detector and generates a pulse whenever the output changes from '0' to '1'. This pulse is then enables the latches in the register set to sample the actual counter value.

The pulse is going high for a complete clock cycle.

Register Set

The register set comprises latches, which will hold the actual counter value when the pulse of the pulse generator arrives.

The register set actually consists of two sets, one in which the counter value can be stored, the other from which the stored value is taken during read-out. This enables the conversion of a line while the previous line is read-out.

While this invention has been particularly shown and described with references to preferred embodiments thereof, it will be understood by those skilled in the art that various changes in form and details may be made therein without departing from the scope of the invention encompassed by the appended claims.

What is claimed is:

1. An integrated sensor chip comprising at least one pixel, wherein the at least one pixel comprises:
    at least two integration regions for receiving and storing photogenerated charges;
    a modulation region that moves the photogenerated charges to be stored in the at least two integration regions;
    sense nodes, in which each of the sense nodes is associated with one of the integration regions, into which the photogenerated charges are moved from the integration regions during a readout cycle; and
    wherein the chip comprises:
    at least one function generator for generating a time-varying function that is applied to the integration regions during the readout cycle to move the photogenerated changes to the sense nodes;
    a counter that generates a count during the generation of the time-varying function;
    registers, in which each of the registers is associated with one of the sense nodes during the readout cycle, for storing digital values;
    wherein the registers store the count in response to the associated sense node receiving photogenerated charges from the associated integration regions.

2. An integrated sensor chip as claimed in claim 1, wherein the modulation region comprises modulation gates associated with each of the integration regions for generating a drift field to move the photogenerated charges between the integration regions.

3. An integrated sensor chip as claimed in claim 2, wherein the modulation region moves photogenerated charges to the integration regions synchronously with a radiation source that illuminates a field of view of the sensor.

4. An integrated sensor chip as claimed in claim 1, further comprising charge detectors associated with each of the sense nodes for signaling the associated registers when the sense nodes receive photogenerated charges.

5. An integrated sensor chip as claimed in claim 1, wherein the function generator generates the time-varying function which is a voltage ramp function.

6. An integrated sensor chip as claimed in claim 1, wherein the function generator generates the time-varying function which is a linear voltage ramp function.

7. An integrated sensor chip as claimed in claim 1, wherein the function generator generates the time-varying function which is a logarithmic voltage ramp function.

8. An integrated sensor chip as claimed in claim 1, wherein the function generator generates the time-varying function which is a voltage ramp function having at least two regions of different rates of change as function of time.

9. An integrated sensor chip as claimed in claim 1, wherein the function generator generates the time-varying function which is a voltage ramp function having at least three regions of different rates of change as function of time.

10. A read out method for an integrated sensor chip comprising
    receiving and storing photogenerated charges in at least two integration regions synchronously with modulated radiation illuminating a scene;
    moving the photogenerated charges to be stored in at least two integration regions;
    moving the photogenerated charges from the integration regions to sense nodes during a readout cycle by applying a time-varying function to the integration regions;
    generating a count during the generation of the time-varying function;
    storing the current count in response to the associated sense node receiving photogenerated charges from the associated integration regions.

11. A method as claimed in claim 10, wherein the time-varying function is a voltage ramp function.

12. A method as claimed in claim 10, wherein the time-varying function is a linear voltage ramp function.

13. A method as claimed in claim 10, wherein the time-varying function is a logarithmic voltage ramp function.

14. A method as claimed in claim 10, wherein the time-varying function is a voltage ramp function having at least two regions of different rates of change as function of time.

15. A method as claimed in claim 10, wherein the time-varying function has at least three regions of different rates of change as function of time.

* * * * *

UNITED STATES PATENT AND TRADEMARK OFFICE
CERTIFICATE OF CORRECTION

| | |
|---|---|
| PATENT NO. | : 7,889,257 B2 |
| APPLICATION NO. | : 12/175091 |
| DATED | : February 15, 2011 |
| INVENTOR(S) | : Thierry Oggier et al. |

It is certified that error appears in the above-identified patent and that said Letters Patent is hereby corrected as shown below:

In claim 1, column 11, line 42, delete "changes" and insert --charges--.

Signed and Sealed this
Twenty-fifth Day of December, 2012

David J. Kappos
*Director of the United States Patent and Trademark Office*